Dec. 28, 1948. P. E. POLLARD 2,457,396
RADIO LOCATING APPARATUS
Filed Oct. 8, 1943 10 Sheets-Sheet 6

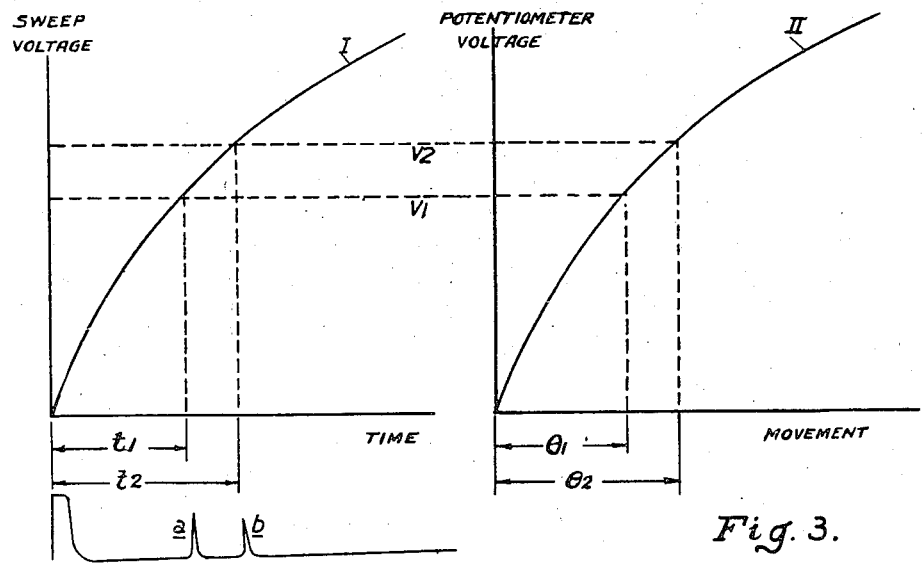
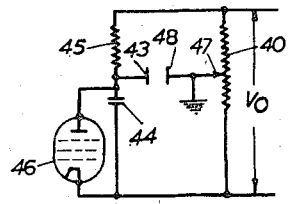
Fig. 4.
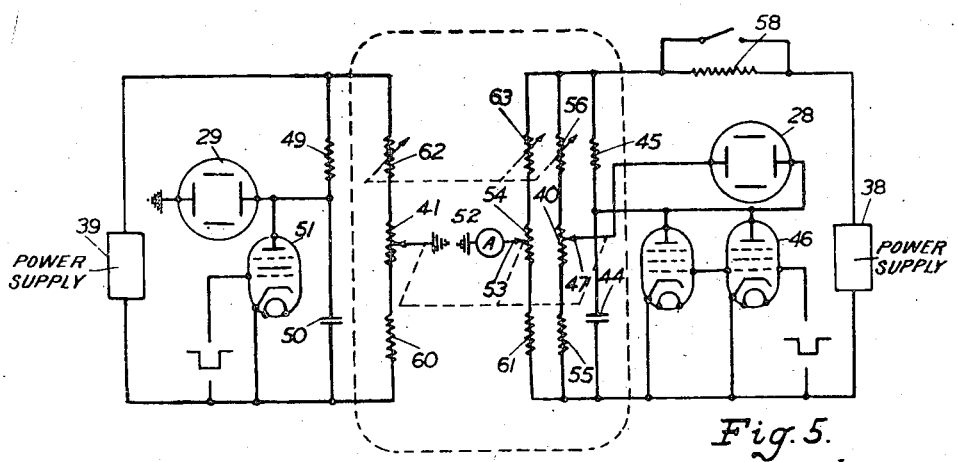
Fig. 5.
Philip Edward Pollard Inventor
By Loyd Hall Sutton
Attorney

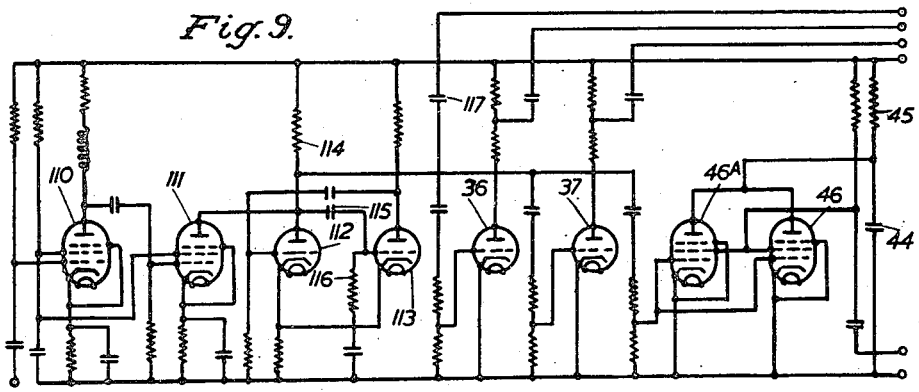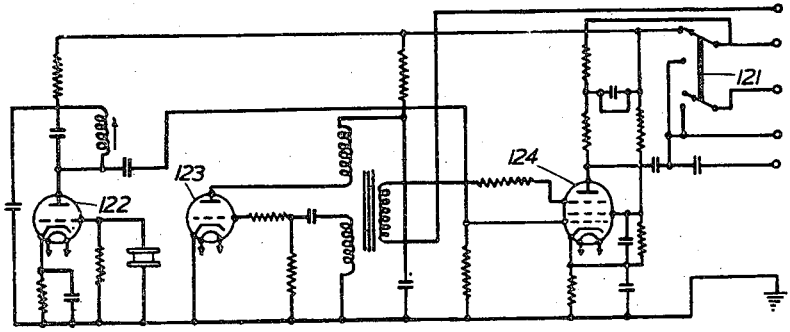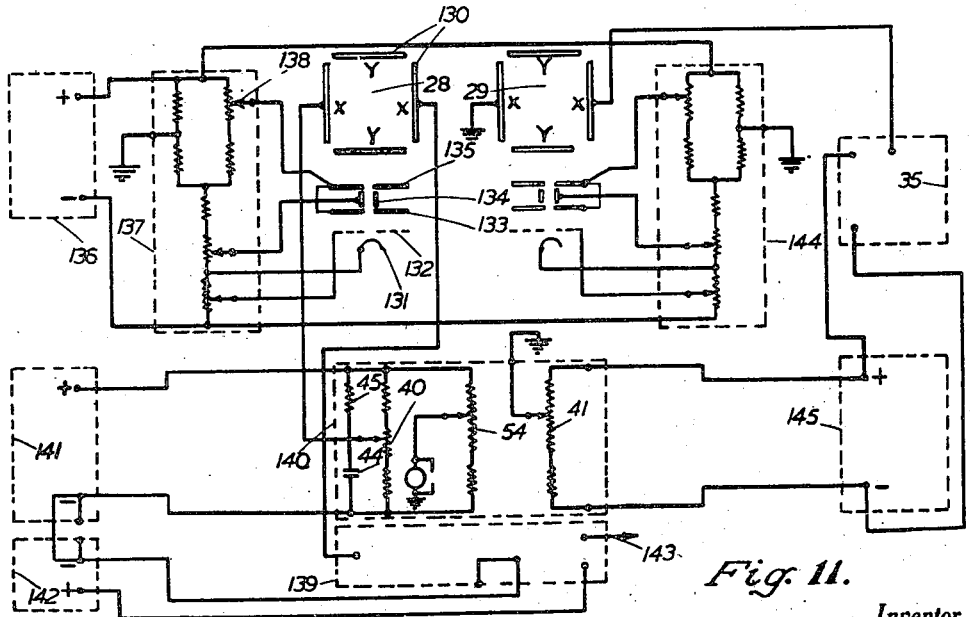

Inventor
Philip Edward Pollard
By
Loyd Hall Sutton
Attorney

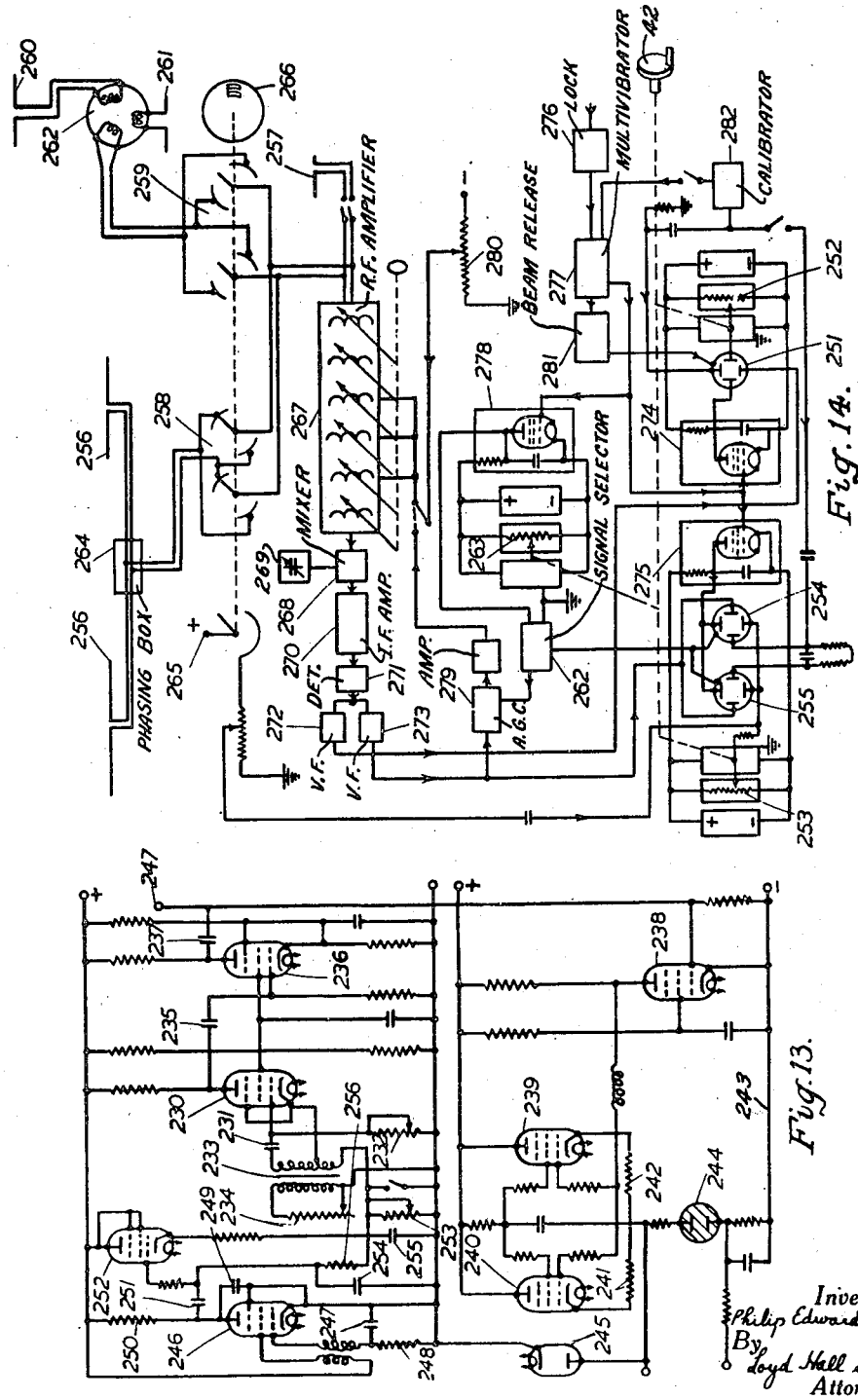

Dec. 28, 1948.　　　　P. E. POLLARD　　　　2,457,396
RADIO LOCATING APPARATUS

Filed Oct. 8, 1943　　　　　　　　　　　　　10 Sheets-Sheet 8

Inventor
Philip Edward Pollard
By
Loyd Hall Sutton
Attorney

Dec. 28, 1948.  P. E. POLLARD  2,457,396
RADIO LOCATING APPARATUS
Filed Oct. 8, 1943  10 Sheets-Sheet 9

Inventor
Philip Edward Pollard
By
Loyd Hall Sutton
Attorney

Dec. 28, 1948.  P. E. POLLARD  2,457,396
RADIO LOCATING APPARATUS

Filed Oct. 8, 1943  10 Sheets-Sheet 10

Inventor
Philip Edward Pollard
By
Loyd Hall Sutton
Attorney

Patented Dec. 28, 1948

2,457,396

UNITED STATES PATENT OFFICE 2,457,396

RADIO LOCATING APPARATUS

Philip Edward Pollard, London, England, assignor to Minister of Supply in His Majesty's Government of the United Kingdom of Great Britain and Northern Ireland, London, England Application October 8, 1943, Serial No. 505,553
In Great Britain March 24, 1942

Section 1, Public Law 690, August 8, 1946
Patent expires March 24, 1962

7 Claims. (Cl. 343—11)

The present invention relates to radio apparatus for locating the position and following the movement of a distant body by means of radio frequency energy radiated in the form of an exploring beam by a transmitter and reflected by the target back to a receiver.

In the apparatus according to the invention the exploring beam is pulse-modulated; that is to say, it consists of very short pulses of radio-frequency energy separated by much longer quiescent periods during which the reflected pulses or echoes can be received. By means of a cathode ray tube oscillograph the time interval between the transmission of an outgoing pulse and the receipt of the incoming echo is measured, this time interval being a measure of the slant-range of the body giving rise to the echo. The echo-signal is also picked up on an aerial system having a sharp directional response and by means of a second cathode ray oscillograph the amplitude of the echo signal picked up on this aerial system can be observed for the purpose of determining the angle of bearing of the body. Another aerial system and associated oscillograph can be employed in a similar manner for determining the angle of elevation of the body.

One object of the present invention is to provide improved means for measuring the time interval between the outgoing and incoming signals.

Another object of the invention is to provide means for correlating the presentation of a selected echo signal on the several oscillographs so that the several observers of these oscillographs can make their simultaneous observations on one and the same target without ambiguity or confusion.

Another object of the invention is to provide improved means for determining when the orientation of the aerial system is such that the amplitude of the echo signal picked up by it is a minimum, and for determining without ambiguity whether changes in this amplitude indicate increases or decreases in the angle of bearing (or elevation) of the body.

Another object of the invention is to provide improved means for generating very short pulses of radio-frequency energy at high power.

Further objects of the invention will appear from the following detailed description of two alternative forms of apparatus embodying the invention. The first form of the apparatus is described with reference to Figs. 1–11 of the accompanying drawings in which Figs. 1 and 2 are block diagrams of the transmitter and receiver;

Fig. 3 is an explanatory diagram;

Figs. 4 and 5 are circuit diagrams illustrating the method of potentiometer control;

Fig. 9 is a circuit diagram of the time-base circuit;

Fig. 10 is a circuit diagram of the calibrator unit; and

Fig. 11 is a diagram showing the layout of the cathode ray tubes and associated circuits.

Figure 12:
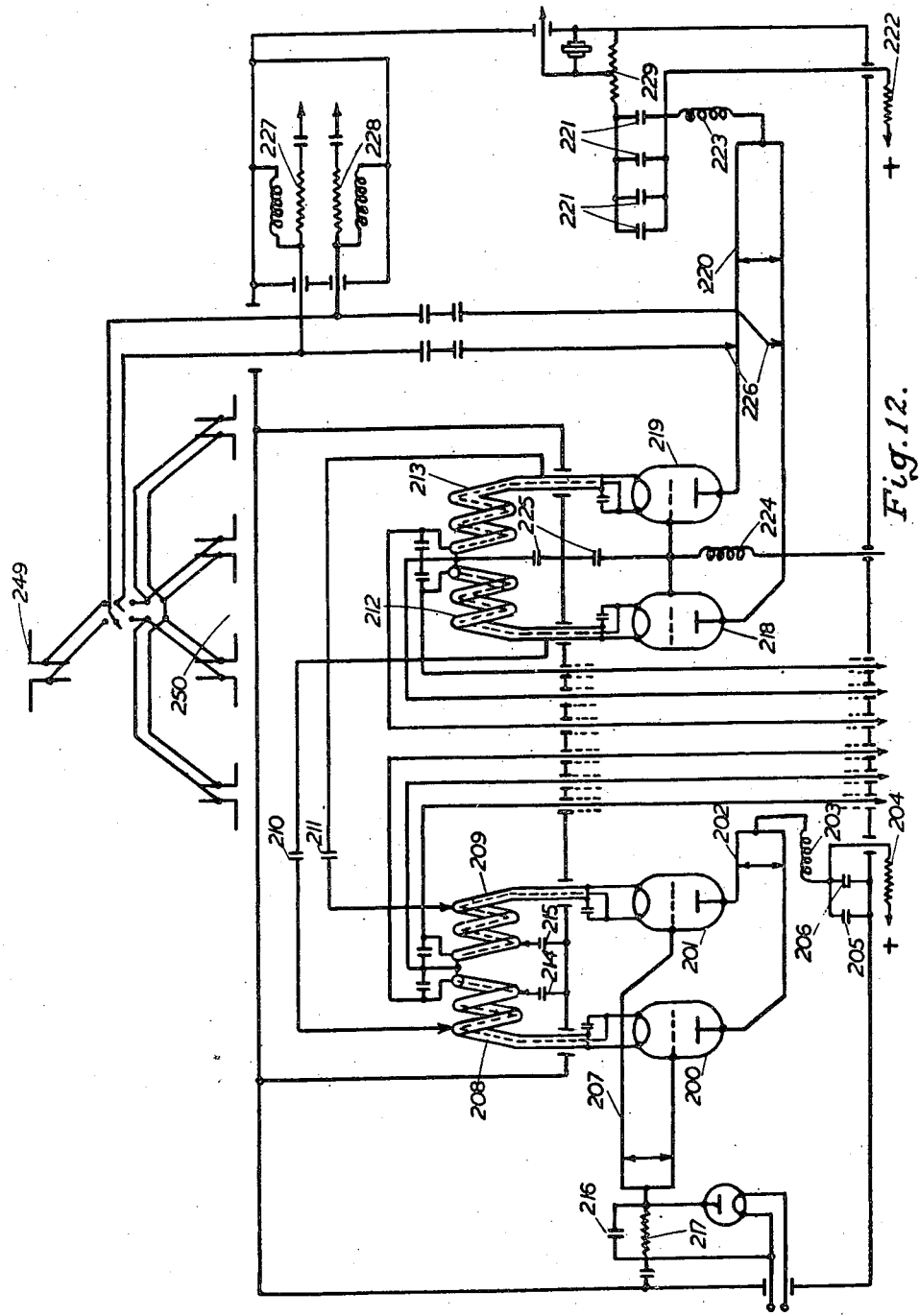
Figure 15:
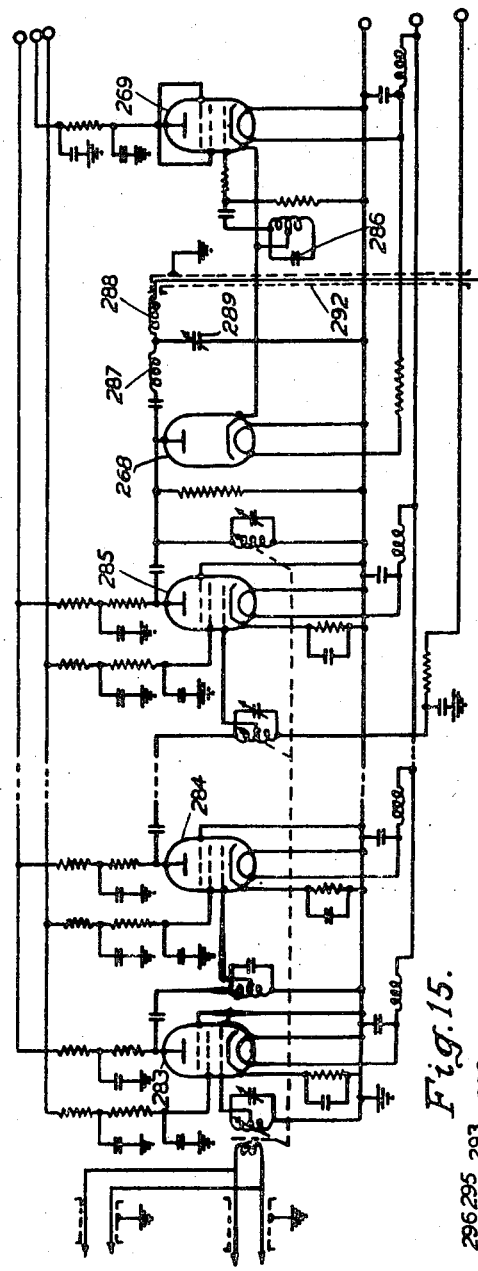
Figure 16:
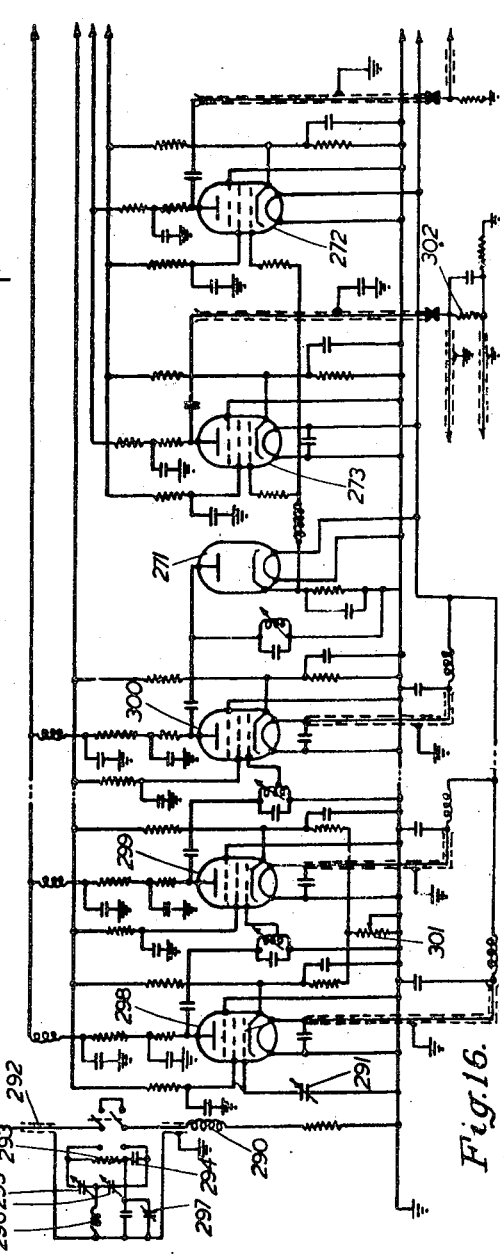
Figure 17A:
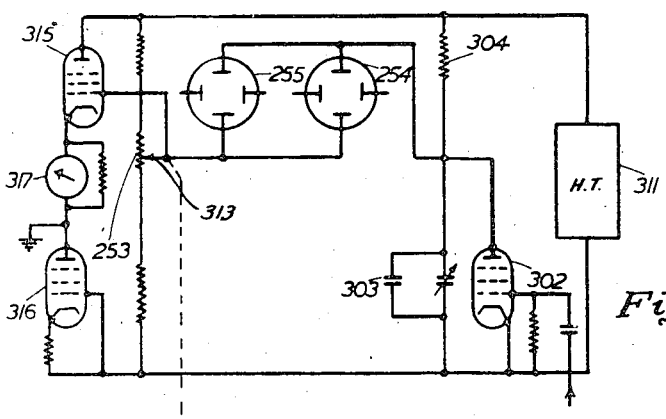
Figure 17B:
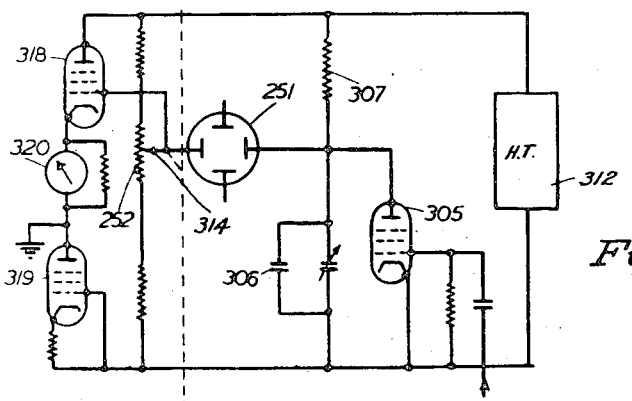
Figure 18:
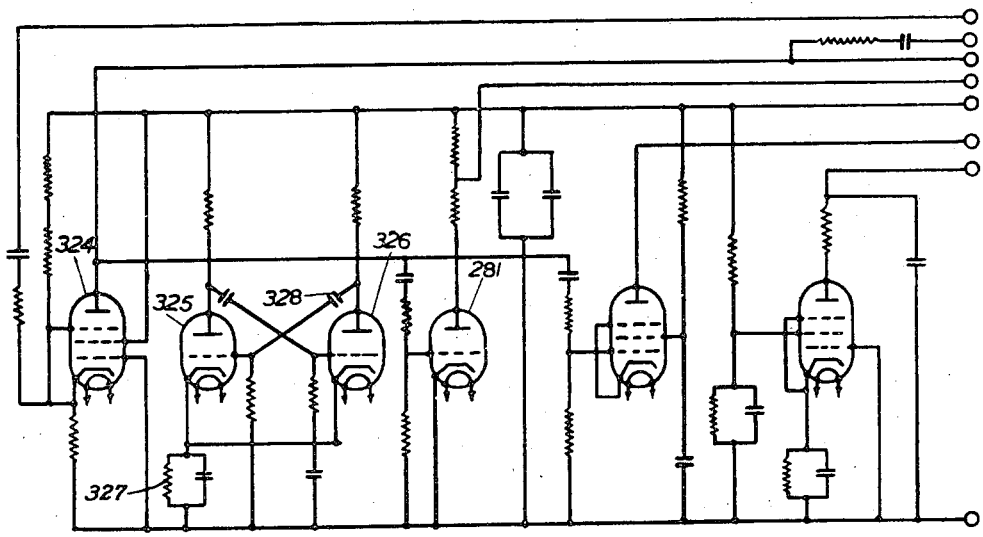

The second form of apparatus is described with reference to Figs. 12–19 of the drawing in which Figs. 12 and 13 are circuit diagrams of the master oscillator and modulator unit;

Fig. 14 is a block diagram of the receiver;

Figs. 15 and 16 are circuit diagrams of the signal receiver;

Fig. 17 (a, b, c) are schematic diagrams of the time base generators and associated potentiometers;

Fig. 18 is a circuit diagram of the time base circuit; and

Figure 19:
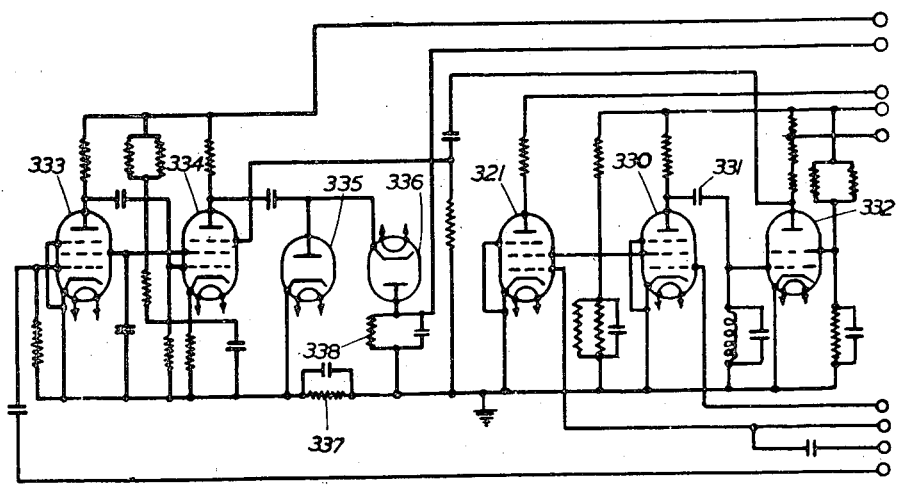

Fig. 19 is a circuit diagram of the signal selecting and automatic gain control units.

The apparatus to be described with reference to Figs. 1–11 of the drawings is designed to provide a continuous indication of distance or slant range of a target by means of a cathode ray tube and a separate indication of the angle of bearing of the target on a second cathode ray tube and is provided with means whereby both indications are correlated and identified with the particular target that is selected for scrutiny.

A brief description of the various component parts of the apparatus and the manner in which they co-operate to produce the desired result will first be given with reference to Figs. 1 and 2 which are block diagrams of the transmitter and receiver.

The transmitter comprises a master-oscillator 1 operating on a wavelength of between 3.5 and 5.5 metres connected through an amplifier 2 to a half-wave di-pole aerial 3. The oscillator is normally blocked by means of a negative bias, but this is periodically removed by the application of positive voltage impulses from the modulator unit 4, the frequency of these impulses lying within the range of 1,000–2,500 per second. The master-oscillator operates in the following manner: after being triggered by an impulse from the modulator 4 it generates a train of ultrashort wave signals until the resulting flow of rectified current builds up a prohibitive negative bias on the grid when it ceases until the arrival of the next positive impulse. As a result a pulse-modulated beam of radio frequency energy is radiated from the aerial 3, the duration of each pulse being 2 or 3 microseconds and the frequency of the pulses being from 1000–2500 per second. A portion of the output is tapped from the aerial feeder and passed through an attenuator 5 to the signal plates of a monitor tube 6, the sweep plates of which are fed with a sweep voltage from the generator 7 which is locked to the modulator 4. Filament supply units for the oscillator 1 and amplifier 2 are indicated at 8, the H. T. supply unit at 9 and the grid bias unit for the amplifier 2 at 10, whilst 11 and 12 indicate the power units for the modulator and monitor tube.

Figure 2:
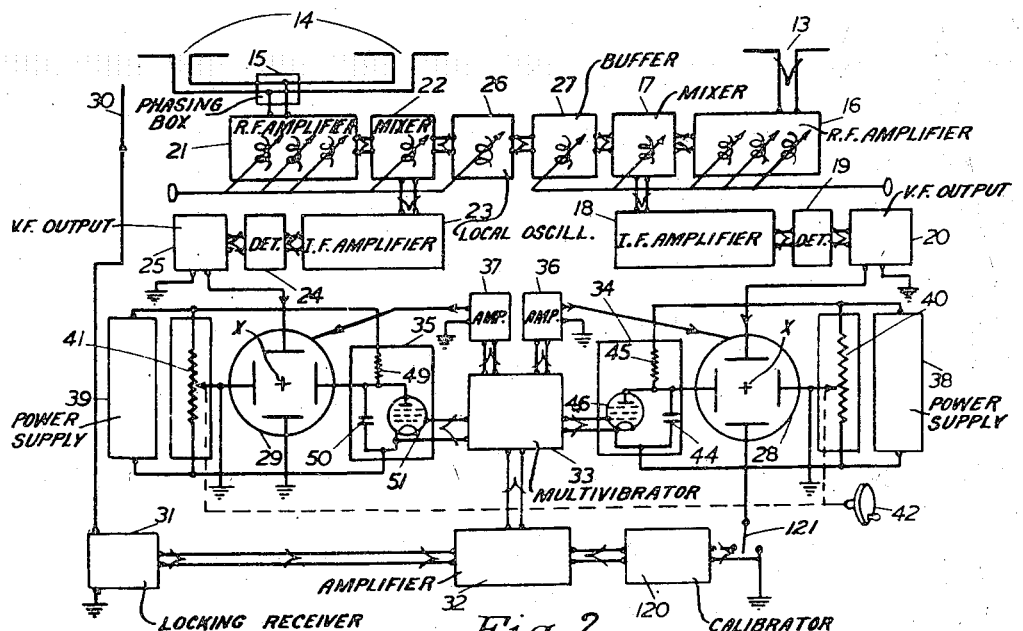

If a target is present within the field of the transmitter an echo-signal in the form of reflected pulses of radio frequency energy will be received at the receiving unit shown in Fig. 2 which is situated in the neighbourhood of the transmitter. The receiver is provided with two aerial systems, one 13 consisting of a dipole provided with a keyed reflector (not shown) for determining the slant range of the target, and the other 14 consisting of a horizontally separated pair of dipoles; also fitted with reflectors, and coupled through a phasing-box 15, for determining the angle of bearing of the target. The output of the range aerial 13 is passed to a super heterodyne signal receiver consisting of a radio-frequency amplifier 16, mixer 17, intermediate frequency amplifier 18, second detector 19 and video-frequency output stage 20, whilst the output of the bearing aerial 14 is passed to a second signal receiver consisting of a radio-frequency amplifier 21, mixer 22, intermediate frequency amplifier 23 second detector 24 and video-frequency output stage 25. A single local oscillator 26 is common to both signal receivers and a buffer stage 27 is included to prevent interaction between them. The output stage 20 is connected to the signal plates of the range indicating tube 28, whilst the output stage 25 is connected to the signal plates of the bearing indicating tube 29.

The transmitted signals are picked up on an aerial 30 the output of which is fed through a receiver 31 and amplifier 32 to trigger a multivibrator 33. The latter controls the time base generators 34, 35 which produce the synchronized sweep voltages for the indicating tubes 28, 29 and also provides positive voltage pulses to the grids of these tubes through the circuits 36, 37 for eliminating the back stroke. 38 and 39 indicate the power supply units for the indicating tubes 28, 29.

At the instant when each outgoing pulse leaves the transmitter, the multivibrator 33 is triggered through the receiver 31 and the sweep voltage applied to one of the sweep plates of the range indicating tube 28 from the generator 34 begins to increase. At a certain time later the incoming reflected pulse will arrive, this time depending upon the slant range of the target. The incoming echo will give rise to an echo trace on the screen of the tube 28, and clearly, the distance of this trace along the time base from the origin of the latter will be a measure of the slant range of the target giving rise to the echo. A similar trace will simultaneously appear on the screen of the bearing indicating tube 29, but since the outputs from the two spaced dipoles of the aerial 14 are connected in phase opposition through the phasing box 15, the amplitude of this trace will be a minimum when the bearing of the target coincides with the direction of minimum response of the aerial 14 which will be substantially in a direction at right angles to the line joining the two aerials. The bearing of the target is accordingly determined by swinging the aerial 14 until the amplitude of the echo trace on the tube 29 is a minimum.

The determination of the slant-range of the target could be done by direct measurement of the position of the echo-trace on a calibrated scale parallel to the time base on the screen of the tube 28. It would be very difficult, however, to calibrate such a scale accurately in terms of the range of the object. This is chiefly due to the fact that in the more usual form of time-base generator, the forward sweep of the spot is controlled by the sweep voltage built up across a condenser connected through a high resistance to a constant source of voltage. Consequently the sweep voltage increases exponentially and not linearly with time, so that direct calibration of the movement of the spot by means of such a scale becomes difficult, particularly towards the end of its sweep. Such direct calibration is further complicated by certain other disturbing factors which come increasingly into play as the spot moves away from the centre of the screen.

A second difficulty in operating the apparatus described so far arises from the fact that there may be more than one target simultaneously present within the field of the transmitter. As simultaneous observations of the screens of the tubes 28, 29 have to be made by different observers, and as there may very well be several echo traces corresponding to the several targets on the screen of each tube, it becomes very necessary to provide means whereby an echo-trace selected for measurement by the observer of the range tube 28 can be automatically correlated with its counterpart on the screen of the tube 29 so that both traces can be simultaneously identified with the particular target that has been selected for scrutiny.

These two difficulties are overcome by providing a range potentiometer 40 connected across the power supply 38 and having its tapping connected to one of the sweep plates of the range indicating tube, and a similar potentiometer 41 connected across the power supply 39 and having its tapping connected to one of the sweep plates of the bearing indicating tube 29, both potentiometers being operated by a common control handle 42 under the control of the range tube observer. The function of these potentiometers and the manner in which they are designed will now be described with reference to Figs. 3–5.

Fig. 3 shows two echo traces $a$, $b$ on the screen of the tube 28 due to the reflection from two targets, the displacement of each trace from the centre of the screen being a measure of the respective time intervals $t_1$, $t_2$ between the outgoing pulse and the echoes produced by reflection from the two targets. Instead of measuring such displacements directly on the screen of the tube, the range potentiometer 40 is used to bring any selected trace to the centre of the screen by applying a suitable biasing voltage to one of the sweep plates. It is clear that the required biasing voltage will be equal to the instantaneous value $v_1$, $v_2$ of the voltage applied to the opposite deflecting plate by the time-base generator 34. The control voltage from the potentiometer 40 can therefore be used to calibrate the movement of the spot or trace. Curve I shows sweep-voltage plotted against time, and curve II shows potentiometer voltage plotted against the movement of its variable control, instantaneous values being indicated for the two echo-traces $a$, $b$. It is required to maintain a linear relation between any given time-interval such as $t_1$, $t_2$ and the corresponding movement $\theta_1$, $\theta_2$ of the potentiometer control.

In Fig. 4, the sweep plate 43 of the range-indicating tube 28 is supplied with a sweep voltage from the exponential time-base 34 comprising a condenser 44 connected to a constant source of voltage $V_0$ through a charging resistance 45. The condenser 44 is periodically discharged at the end of each sweep by the automatic triggering of a value 46 so as to bring the spot back to its initial or zero position. The potentiometer 40 is branched across the same voltage source $V_0$, and the control or centering voltage tapped off by a slider 47 is applied to the opposite plate 48 of the tube.

The voltage $V$ on the time-base condenser 44 at any given moment $t$ is equal to $V_0 (1-e^{-t/CR})$ where $V_0$ is the voltage of the supply; $C$ is the capacity of the condenser 44; and $R$ the value of the charging resistance 45. If the potentiometer slider 47 is set to centre a selected trace, the value of the restoring voltage will be $R_2/R_1 V_0$, where $R_1$ is the total value of the potentiometer resistance and $R_2$ that part of it which is tapped off by the slider. For any given setting of the slider, $R_2/R_1$ is constant and can be replaced by $k$ so that $V_0(1-e^{-t/CR}) = K V_0$, and $(1-e^{-t/CR})$ is constant, and independent of any variations that may occur in the supply voltage or in the working characteristics of the tube.

When a selected trace has been centered, the voltage on plate 43 being equal to the voltage on plate 48, there is no deflecting field, and the centre of the screen is the electrical zero of the system. This gives optimum focussing of the echo-trace and sweep-line and, is general, the most favourable conditions for observation. Moreover the balanced method of control permits the use of a cathode ray tube of relatively small dimensions, since any necessary adjustments for critical observation occur at the centre of the screen. For operational reasons the potential of both plates 43, 48 should be approximately the same as that of the third anode, which is earthed.

The time-constant upon which the grading or calibration of the potentiometer 40 is based is, in practice, determined (a) by the value of the time-base voltage necessary to drive the spot at the required speed, (b) by the values of the charging and potentiometer resistances required to keep the current within reasonable limits, and, after these two factors have been fixed, (c) by the particular value of capacity which in combination with the charging resistance 45 is found to give the most favourable form of curve over the range selected for calibration.

A time-interval of six microseconds corresponds approximately to a slant range of 1,000 yards. Taking $V_0=4,000$; $R=1$ megohm; $R_1=2$ megohms; and a time-interval of $6 \times 14 = 84$ microseconds. to cover a slant-range of 14,000 yards, the time-constant $CR$ for the most favourable form of curve was found to be 1/6000. This sets the value of $C$ at 160 m. mf.

At a given time $t$, the sweep voltage on the deflecting plate is $V=V_0 (1-e^{-t/CR})$. Considering the current $I$ then flowing through the potentiometer, $V=R_2I$ and $V_0=R_1I$. Therefore by substitution $R_2=R_1 (1-e^{-t/CR})$.

A selected part $R_2$ of the potentiometer resistance can then be calibrated say in slant-range units of 50 yards, by giving corresponding values to $t$ in the above expression. If as before, 6 microseconds represents a slant-range of 1,000 yards, the equivalent time for 50 yards will be 0.3 microseconds, and the calibration formula becomes $2 \times 10^6 \cdot (1-e^{-0.0018})$. Resistance bobbins each representing a 50-yard unit, are then separately wound and connected to contacts arranged at equal intervals around the potentiometer dial, so that equal angular movements of the control slider 47 represent equal distances in slant range.

Calibration on this scale can be extended as far as required. As a matter of expediency, the 50-yard unit is applied in one form of apparatus to ranges between 2000 and 14,000 yards, the first 2000 yards being ignored. A calibration unit of say 250 yards can then be used for the longer ranges of operation, say between 14,000 and 30,000 yards, by successively varying the overall resistance left in series with the voltage supply thus further increasing the voltage on the slider. In this case calibration is most easily effected by trial and error. A stationary wave-form, representing say a six microsecond interval, is projected on to the screen of the tube by a crystal-controlled oscillator, and the value of resistance required to shift a selected wave through the equivalent of each 250 yards of slant-range is determined by actual test. Corresponding resistance bobbins are then wound and connected as before, to a series of contacts on a second dial which is arranged to come automatically into action when the first or 50-yard dial reaches its maximum setting of 14,000 yards.

Fig. 5 illustrates how the second difficulty mentioned above is overcome by using two ganged potentiometers 40, 41. The time-base generator of the range indicating tube 28 is fed from a 4000 volt supply 38 and is of the exponential type comprising a condenser 44, charging resistance 45, and triggering valve 46. The time-base generator of the bearing indicating tube 29 is similarly fed from a 2000-volt supply 39 through resistance 49, condenser 50 and triggering valve 51, the values of resistance and capacity being based upon the same time-constant in both cases. The bearing control potentiometer 41 is electrically symmetrical with the range control potentiometer 40, and the earthed slider 52 is ganged to the sliders 47 and 53. It follows that when any selected echo-trace is brought by the slider 47 to the centre of the range tube 28 for observation, the counterpart of the same trace will be simultaneously centered on the screen of the bearing tube 29. This correlation automatically identifies both traces as being due to the particular target selected for observation. The screens of the tubes are preferably provided with suitable reference marks X to enable accurate centering to be achieved.

For reasons already stated, the voltage on the sweep-plates should be approximately the same as the voltage on the earthed anode of the tube. The potentiometer 40, the time-base circuit 44, 45, 46, and the 4000-volt power-pack 38 are accordingly all carefully insulated, and the control slider 47 would be the only earthed point of the system. The power supply would then "float," its actual potential to earth varying with the position of the slider 47. Under these circumstances any leakage from the live rails to earth would be in parallel with the potentiometer 40 and would vary the current flowing through it. To limit the error due to this cause to less than one in a thousand, particularly at the higher-range settings, the leakage resistance should be kept above 1000 megohms, which is a standard of insulation difficult to attain in practice.

Accordingly, instead of directly earthing the control slider 47, the potentiometer 40 is connected to a parallel resistance 54, which serves as a leakage guard. The resistance 54 is electrically symmetrical with the main potentiometer 40, and is directly earthed through a slider 53 which is ganged to the control slider 47. Unavoidable leakage currents now pass to earth through the guard without varying the current through the main potentiometer 40. A slight potential difference may be set up between the sliders 47 and 53, but this can be ignored, provided it is not sufficient to upset the focussing of the spot. The provision of the guard reduces the required degree of insulation to practicable limits without involving a range error of more than one in a thousand. The similar leakage guard is not provided for the bearing potentiometer 41 as the same standard of accuracy is not required from the bearing tube.

As previously mentioned the first 2000 yards are ignored, this being covered by the resistance 55 which is therefore not calibrated. Also the remaining resistance 56 in series with the potentiometer 47 may be separately calibrated and controlled in steps of 250 yards and used for ranges between 14,000 and 30,000 yards. Resistances 60, 61 corresponding to the resistance 55, and variable resistances 62, 63 corresponding to the variable resistance 56 and ganged with it, are provided in series with the potentiometers 41 and 54.

The normal line-sweep across the screen is sufficient to include echoes from bodies within a range of 14,000 yards. It is, however, possible, by switching a resistance 58 into series with the time-base supply, to reduce the voltage across the X-plates of the tube 28 so as to bring echoes from bodies within a distance of say 30,000 yards on to the screen. An "overrun" pointer, mounted in front of the range screen, is then brought into line with a selected echo, and the corresponding range is read off from the calibrated scale on which the pointer is based. A corresponding overrun pointer on the bearing tube 29 can then be adjusted to the same reading and a bearing taken of the echo-trace so identified. It will be noted that these operations serve as a preliminary to the use of the potentiometer control for making more accurate observations. Bearing signals are received on the pair of horizontally-spaced dipoles 14 provided with reflectors, the pick-up energy being opposed in the phasing box 15 so as to give a directional response with two broad and two sharp minima. Bearings are taken on the sharp minima, which is prearranged to be in line with the maximum response of the range dipole 13.

When an echo trace has been centred on the screen of the range tube 28, and its "sense" has been determined, the bearing of the body under observation is taken by swinging the directional aerial system 14 until the echo trace then at the centre of the bearing tube 29 shows at minimum amplitude. The necessary rotation of the aerials is effected by means of a pair of hand-wheels mounted on a traversing column or post, which is fitted with a dial to indicate its orientation.

The movements of this traversing column, as well as those of the range potentiometer control, may be transmitted through Selsyns or similar synchronizing gear to a distant control point.

A more detailed description of the various circuits employed in the transmitter and receiver will now be given with reference to Figs. 6–11.

Figure 6:
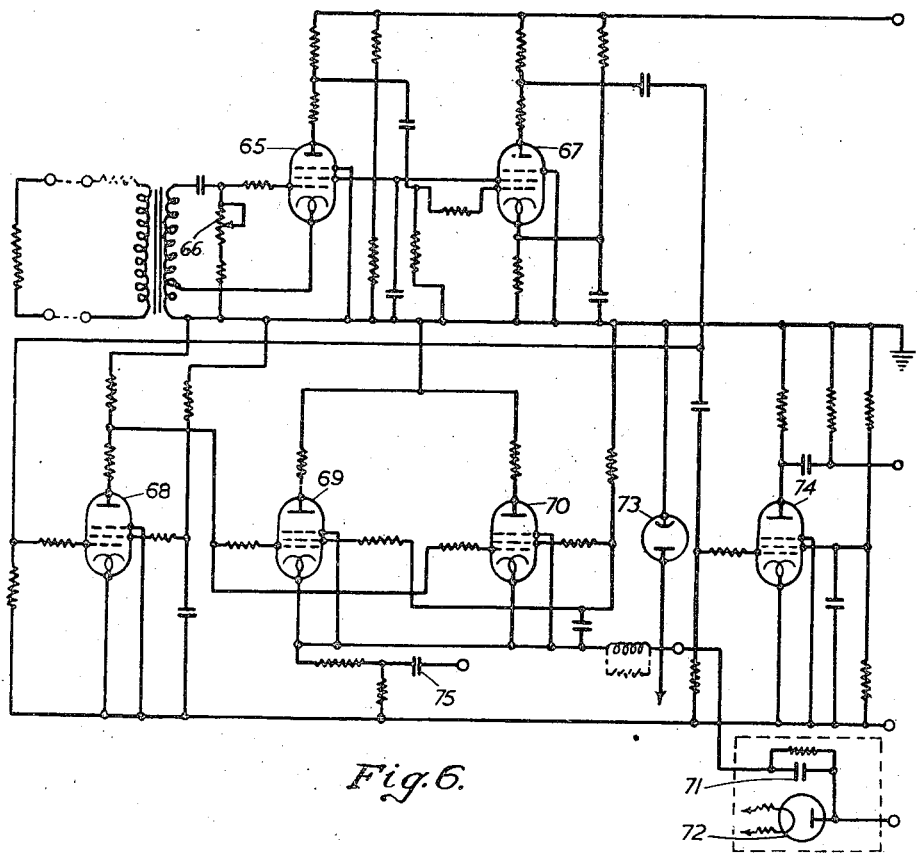
Figs. 6 and 7 are circuit diagrams of the modulator and master oscillator.

Fig. 6 shows the modulator unit 4 of the transmitter in detail. A strongly back-coupled valve 65 generates a low-frequency "relaxation" voltage which controls the pulsing or repetition frequency of the master-oscillator 1 (Fig. 1). The repetition-frequency can be varied within limits say of 1000 and 2500 cycles, either to minimise interference or for other reasons, by adjusting a resistance 66 shunted across the grid circuit. The valve 65 is coupled through amplifiers 67, 68, which also serve to "peak" the voltage-wave, to the grids of two cathode-followers 69, 70, the cathodes of which are normally held at about 900 volts negative. The onset of the control pulse throws the grids of 69, 70 positive, the cathodes follow suit, and a corresponding positive pulse is fed through a small condenser 71 to the grid Lecher wires of the oscillator unit 1. A diode valve 72 is provided to bypass any reverse grid-current in the oscillator, whilst a second diode 73 provides a safeguard against a flash-over.

Figure 1:
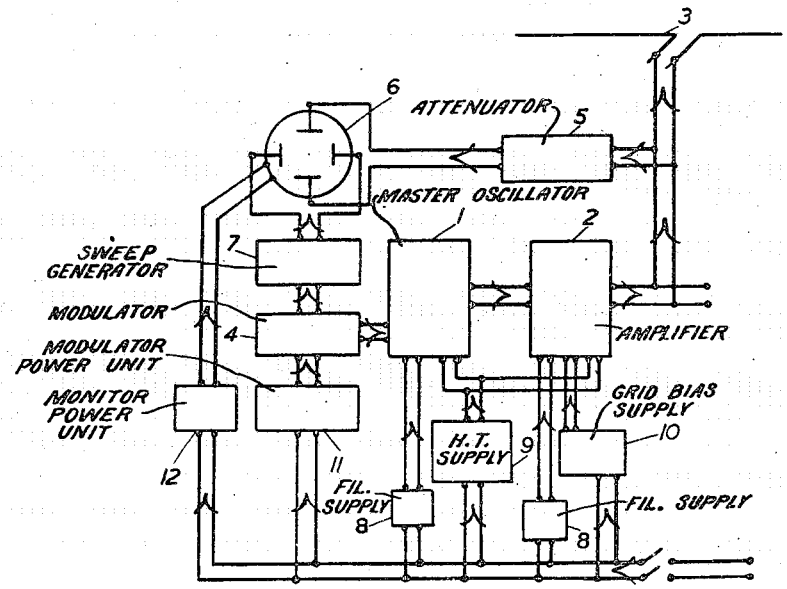

The amplifier 67 is also coupled to a pentode 74 which serves as the discharge valve in the sweep voltage generator 7 of the monitor cathode ray tube 6 (Fig. 1). Pulses from the cathode of the valve 69 are also applied through the condenser 75 to the negatively biased grid of the monitor tube 6 to release the electron stream during the forward movement of the spot over the screen; this, in effect, serves to eliminate the back-stroke, and gives a clearer picture.

Figure 7:
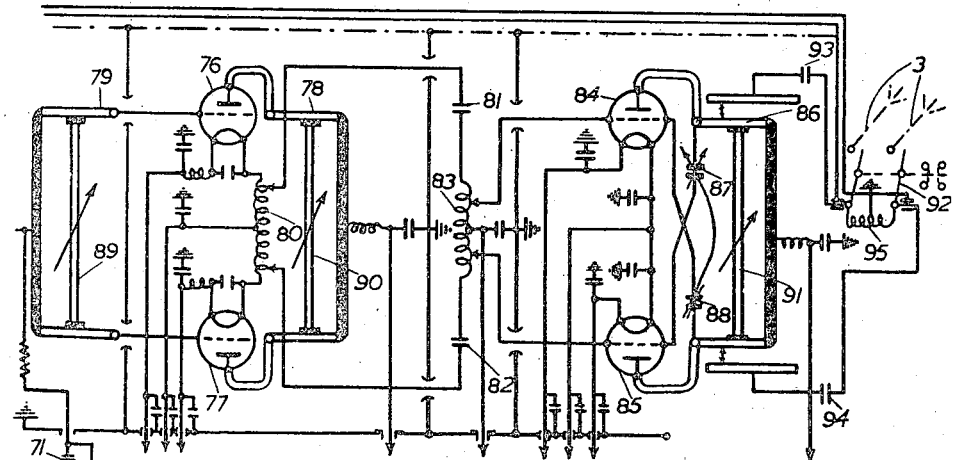

The master-oscillator stage 1 for generating the pulsed high-frequency signal, is shown in detail in Fig. 7. It comprises two push-pull valves 76, 77, the anode and grid circuits being tuned by Lecher wires 78, 79 over a range of from 3.5 to 5.5 metres. A paralysing negative bias is normally applied to the mid-point of the common Lecher-wire connection to the two grids. When this is removed by the low-frequency pulsing voltage applied through condenser 71, the oscillator is triggered into operation, and continues to generate a train of ultra-short signal waves until the resulting flow of rectified current builds up a prohibitive negative bias on the grid. By suitably selecting the time-constant of the grid circuit, this action is utilized to limit the duration of each train of signal waves to a period of from 2 to 3 microseconds after which radiation ceases until it is again initiated by the application of the next pulsing-control impulse from the modulator.

The output from the master oscillator is tapped off from an inductance 80 shunting the common cathode circuit, and is fed through condensers 81, 82 to a semi-aperiodic inductance 83 in the input of a "driven" radio-frequency amplifier. This unit comprises two similar push-pull valves 84, 85, with a common tuned Lecher wire output 86, adjustably coupled through tappings to the transmitting aerial 3. Both amplifiers are cross-coupled by neutralizing condensers 87, 88, to prevent regenerative feed-back, and the grids are normally biased to cut-off.

The oscillator and radio amplifier circuits are provided with suitable tuning controls 89, 90 and 91.

The transmitting aerial 3 is a telescopic half-wave dipole mounted to rotate through approximately ninety degrees. It is coupled, through telescopic matching stubs and a feed-line, to one or the other of two sets of terminals on a change-over switch 92 which is ganged to the wavechange switch used for the pre-set frequencies.

The aerial can be used at two different heights, the higher setting being preferably used for the longer waves, and the lower for the shorter. Two blocking condensers 93, 94 between the coupling-taps to the amplifier and the change-over switch allow the aerial to be earthed through a radio-frequency choke 95.

Figure 8:
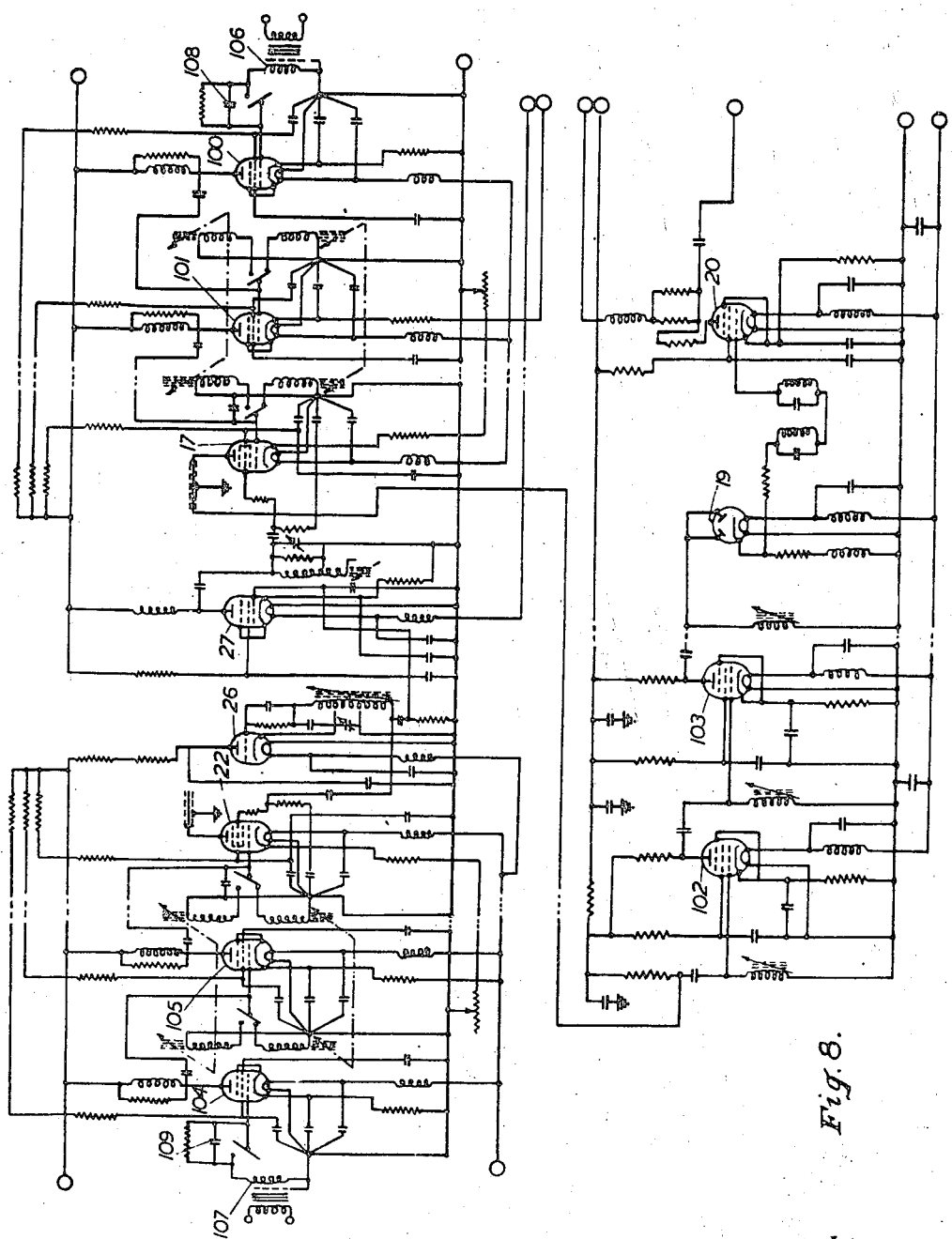
Fig. 8 is a circuit diagram of the signal receiver.

The circuits of the signal receiver 16—27 (Fig. 2) are shown in detail in Fig. 8. The incoming signals from the aerial 13 are first passed through a four-stage radio-frequency amplifier 16, of which the first two stages 100 and 101 are shown in Fig. 8, the output from the fourth stage (not shown) being fed to a hexode mixer 17. This, in turn, is coupled to a common local-oscillator stage 26, (of which the first harmonic is used) through a "buffer" valve 27, which is included to prevent interaction and the transfer of "noise" from the range to the bearing channel. The mixer 17 feeds a four-stage intermediate-frequency amplifier 18 of which the first two stages are shown at 102 and 103. The output from the fourth stage (not shown) is passed through a diode rectifier 19 to an output valve 20, feeding one of the Y-plates of the range tube 28.

Signals from the bearing aerial 14 pass through a similar four-stage radio frequency amplifier 21 (the first two stages 104, 105 only being shown in the drawing) to a mixer 22, which is coupled directly to the oscillator 26. From the mixer 22, the signals pass through a separate intermediate-frequency channel 23, 24 to an output valve 25 feeding one of the Y-plates of the bearing tube 29. To save space, this channel 23—25 is not shown in Fig. 8, as it is identical with the channel 18—20 for the range signals.

The input circuit of each of the first radio-frequency amplifier stages 100 and 104 includes a semi-aperiodic transformer 106, 107 designed to resonate with the valve capacities at a frequency in the middle of the lower wave-range. On the higher range, series condensers 108, 109 are switched into circuit. The remaining stages are tuned by variable inductances with powdered-iron cores which are ganged to a common control-cam.

The local-oscillator stage 26 is tuned by a separate cam which is shaped to ensure correct tracking over the whole range. To avoid having to switch this stage when changing from one wave-range to the other, the expedient is adopted of using for the longer-wave range an oscillation frequency which is higher than the original frequency and for the shorter-wave range an oscillation frequency which is lower than the signal frequency. The intermediate frequency is fixed at 7.7 megacycles, though the tuning of alternative I. F. stages is "staggered," one slightly above and the other slightly below the "fixed" value in order to cover a wider band. For this reason the tuning of each I. F. stage is individually controlled.

Circuit details of the amplifier 32, multivibrator 33 and time base generator 34 for the range tube are shown in Fig. 9. The circuit includes two amplifiers 110, 111, a pair of cross-coupled valves 112, 113 forming the multivibrator, two backstroke-eliminator valves 36, 37 for the range and bearing tubes respectively, and a pair of pentodes 46, 46A which operate in parallel to discharge the timing condenser 44. The input amplifiers 110, 111 are triggered by the outgoing signal from the transmitter, through the locking receiver 31 (Fig. 2). This puts a high negative impulse on the grids of the pentodes 46, 46A so that the timing condenser 44 starts to charge. Its potential is applied to one of the X-plates of the tube 28, and the spot begins to move across the fluorescent screen.

The voltage drop across the anode resistance 114 of the amplifier 111 has meanwhile "reversed" the initial setting of the cross-coupled unit 112 and 113 so that 113 now passes full anode current whilst 112 is blocked. This condition lasts for a period determined by the time-constant of the condenser 115 and resistance 116, and serves to hold the grids of the valves 46 and 46A at cut off for a period of about 300 microseconds. The relaxation unit then returns to its initial setting, and the timing condenser 44 is discharged. A quiescent period follows, until the arrival of the next impulse from the locking receiver.

A lead from the relaxation unit 112, 113 is taken through the condenser 117 to the grid of the discharger valve 51 of the time base generator 35 (Fig. 2) for the bearing tube. This circuit is not shown in detail as it is substantially similar to that of the range tube.

The valves 36 and 37 are also energized by the arrival of each locking impulse, and apply a positive pulse to the normally over-biased grids of the range and bearing tubes, so as to release the electron stream during the forward traverse of each spot. In effect, this eliminates the back stroke, and helps to give a clearer picture.

A calibrating unit 120 (Fig. 2) for providing an artificial echo signal of known characteristics can be connected to the signal plates of the range tube 28 through the switch 121. The details of this unit are shown in Fig. 10. It includes a self-starting crystal-controlled oscillator 122 which generates waves at a fixed frequency of 164 kilocycles, corresponding to a time-interval of 6 microseconds, or a range of 1000 yards. A strongly back-coupled valve 123 functions as a blocking oscillator, and generates a positive pulse lasting for about 300 microseconds at a repetition-frequency of say 1000 cycles a second. The crystal oscillator 122 is coupled to the inner grid, and the blocking oscillator 123 to the suppressor grid, of a pentode 124, which acts as a "mixer." Its output consists of a train of waves at crystal frequency, lasting for 300 microseconds, followed by a quiescent period of 700 microseconds.

The output from the pentode 124 is applied to one of the Y-plates of the range tube 28, and simultaneously triggers the time-base circuit 34 which supplies one of the X-plates.

The initial bias on the pentode 124 is set to prevent current flow until both the inner and suppressor grids are simultaneously impulsed. This ensures accurate synchronization between the crystal-controlled oscillator 122 (which is constantly in operation) and the time-base 34, in spite of any slight variations in the frequency of the blocking oscillator. The result is a stationary-wave trace on the screen, in which each wave is separated from its neighbour by a distance representing a range of a thousand yards. A selected wave-peak, say the third, is first aligned with the vertical cross-wire on the screen, and the potentiometer handle 42 is then rotated to move the waves in succession across the screen, until the peak, say of the 13th wave, has replaced the third. The difference between the initial and final readings on the scale of the potentiometer control should then represent 10,000 yards in actual range; otherwise a trimming condenser in the time-base circuit must be adjusted until this is the case. Once these two adjustments have been made, the exponential law of the potentiometer and time-base automatically ensures the required alignment.

The cathode ray tubes are shown more clearly in Fig. 11 which also shows the interconnection and the relation to earth potential of the associated power packs, time base circuits and the potentiometer. The range tube 28 is provided with the usual deflecting plates 130, cathode 131, grid 132, and anodes 133, 134, 135, the necessary operating potentials being derived from a 3000 volt power pack 136 common to both range and bearing tubes. The usual control (indicated in the panel 137) are provided for focussing and regulating the brightness of the spot. In addition two other controls are used to eliminate spot astigmatism; one (not shown) applies a voltage simultaneously to the two Y-plates to produce an effect similar to a cylindrical lens; the other, 138, produces an analagous and complementary effect by varying the voltage on the third anode 135. The cathode 131 and grid 132 are operated at 3000 volts negative and the focussing anode 134 at about 2500 volts negative. The first and third anodes 133, 135 are strapped together and are at approximately earth potentional. The time-base circuits 32, 33, 34 and 36 for the range tube are mounted on the panel 139 and the timing condenser 44 and charging resistance 45 are mounted on the potentiometer panel 140 which carries the range potentiometer 40 and its guard resistance 54. The range potentiometer and time base are fed from the 4,000 volt and 250 volt power packs 141 and 142. The chassis of these power packs and of the panel 139 are insulated from earth, the minimum insulation resistance being 1000 megohms. Lead 143 is connected to the calibrator unit 120 (Fig. 2). The bearing tube is shown at 29 and its associated brightness and focussing controls in the panel 144. The bearing time base 35 and bearing potentiometer 41 are fed from the 2000 volt power pack 145.

The apparatus now to be described with reference to Figs. 12-19 differs from that already described in that (1) means are provided for indicating the angle of elevation of the target, in addition to the angle of bearing, (2) the transmitter is designed to produce much shorter pulses lasting approximately one microsecond, (3) the receiver is designed to give a more positive and accurate indication of the position of minimum reception for determining the angles of bearing and elevation and also to indicate without ambiguity whether these angles are increasing or decreasing, and (4), in addition to the potentiometer control already described, signal selecting means are provided for ensuring that only the echo trace selected by the range tube observer can appear on the screens of the bearing and elevation indicating tubes.

The transmitter employs a modulator unit controlling a master-oscillator, a radio frequency amplifier coupling the oscillator to the transmitting aerials, and monitor tube and associated time base for supervising the performance of the transmitter. The general lay-out of these components is similar to that shown in Fig. 1 and need not be described again.

The time taken for a wireless signal to travel two thousand yards is known to be approximately six microseconds, which is equivalent, when measuring distances by reflection, to a slant-range of one thousand yards. The exploring signal from the transmitter is radiated in pulses in order to allow the reflected signal or "echo" to be discerned during the quiescent period following each pulse, and this, in practice, sets certain limits upon the accuracy with which measurements can be made. During active periods of transmission the receiver is, in effect, out of action, so that a prolonged pulse would prevent observations from being taken at short range. For observations at long range, the duration of the pulse determines the accuracy with which it is possible to discriminate between two distant bodies in close proximity to each other. In a cathode ray indicator, for example, it fixes the base-width of the echo-trace seen on the screen of the tube, and therefore the point at which the traces begin to over-lap for a given difference in slant-range. When directional indications are required any overlap of the traces will also vitiate the necessary comparison of signal strengths.

The power which can be developed by a thermionic oscillation-generator is largely determined by the maximum emission from its cathode. A valve with a thoriated filament, for instance, is capable of developing a peak output of 150 kilowatts when activated intermittently for periods of the order of one microsecond.

From the above considerations it is clear that considerable advantages are obtained by making the duration of each pulse as short as possible, and the master-oscillator illustrated in Fig. 12 and the associated modulator circuit illustrated in Fig. 13 are designed with this end in view.

Referring to Fig. 12, the exploring signal is generated by two push-pull valves 200, 201, which are of the thoriated-filament or other known type capable of developing high power for short periods. A tuned Lecher-wire 202 forming the common anode circuit, is connected to the high-tension supply through a choke 203 and a ballasting resistance 204.

To prevent overloading, the valves actually draw current during each signalling pulse from condensers 205, 206 which are connected from the mid-point of the resistance and choke to earth. The oscillator grids are similarly joined to a common tuned Lecher circuit 207, which is normally held at a high negative potential but is periodically swept, at pulsing or repetition-frequency, by a positive triggering voltage developed by the modulator unit shown in Fig. 13. The oscillator load inductances 208, 209 are connected across each cathode to earth, and are tapped through a transmission line including condensers 210, 211 to a pair of similar inductances 212, 213 forming the cathode input circuit of the radio frequency amplifier. Each of the cathode inductances is made tubular to enclose one of the filament supply leads, the heating current passing to one filament by the inside wire, then through one filament and along the outer tube to the next filament, and back through the inner wire.

Both Lecher circuits of the oscillator are tuned to approximately a quarter-wave and serve primarily as phasing reactances. The oscillator automatically floats into a condition of stability with respect to the supply voltages, the operating frequency being determined by the Lecher circuits, the inter-electrode capacities, and the cathode impedance. The working range extends from 50 to 85 megacycles, the cathode impedances being tapped to earth through condensers 214, 215 over part of this band.

When the grid circuit of the oscillator is impulsed from the modulator unit, both valves start to oscillate and rectified grid current simultaneously begins to build up across a condenser 216, which is shunted by a resistance 217. The value of the condenser is calculated to allow each pulse or train of signal waves to persist for approximately one microsecond, at the end of which time the negative voltage automatically quenches the oscillator. The normal bias is re-imposed before the condenser can discharge through the resistance 217, and the oscillator remains inactive until the onset of the next triggering impulse.

The radio-frequency amplifier consists of a pair of push-pull valves 218, 219 similar to those used in the oscillator. It has a common Lecher-tuned anode circuit 220 which draws current, as before, from condensers 221, connected to earth between a ballasting resistance 222 and high-frequency choke 223. The grids are not tuned. They are normally biased to cut-off through a choke 224 and are earthed through condensers 225. The cathode inductances 212, 213 are similar to those of the oscillator unit, except that the coupling-line is taken to fixed points. In operation the input voltage from the oscillator offsets the initial grid bias on the amplifier and drives it for clear-cut periods of approximately one microsecond. The method of coupling employed has the advantage of automatically stabilising the amplifier, without the use of neutralizing or balancing condensers. In addition it transfers a proportion of the oscillator output direct to the aerial through the amplifier capacities, thus serving to increase efficiency. The output from the amplifier is fed to the aerial system through adjustable tappings 226, on the anode Lecher wires.

A fraction of the high-frequency signal is tapped off from the feed-line through an attenuation-line including the resistances 227, 228, and a delay network, to the signal plates of the monitor tube. Simultaneously locking impulses are taken off from a resistance 229 and fed through a concentric cable to synchronize the time-base circuit of the receiver.

Referring to Fig. 13, the modulator unit includes a back-coupled valve 230 arranged to produce a square-topped output wave at a repetition-frequency which can be varied between limits of say 1000 to 2000 cycles a second. To prevent deliberate jamming or interference, a slight wobble can be superposed on the selected repetition-frequency.

The cathode of the valve 230 is earthed, and its grid is given an initial negative bias which leaks away at a rate determined by the time-constant of the condenser 231 and resistance 232, until the valve starts to pass current, whereupon the back-coupling action through the transformer 233 accelerates the rise of the current to saturation. At this point, the back-coupling effect ceases, and the condenser 231 rapidly charges up to its original negative value, thus producing a periodic square-topped voltage at a frequency which can be further adjusted either by varying the initial biasing condition, or by altering the time-constant of the grid circuit including the resistances 232, 234. The output from valve 230 is fed first through a condenser 235 to an amplifier 236, and then through a condenser 237 to a second amplifier 238. In its passage through the circuits of these valves, the square-topped wave is converted into a sharp peak of positive voltage. This is applied to the grids of two cathode-follower valves 239, 240 arranged in parallel, the resulting change in cathode voltage being fed from the resistances 241, 242 to trigger the master oscillator.

The cathode bus-bar 243 is normally 1000 volts negative so that the mid-point of the resistances 241, 242, and therefore the potential on the grids of the valves 201, 202 (Fig. 12) will be at the same potential until the valves 239, 240 start to conduct, whereupon it will suddenly rise by approximately 900 volts. A gas-filled discharge valve 244, in the cathode circuit of the valves 239, 240 acts as a flexible resistance to minimize the effect of voltage fluctuations occurring between successive peaks, whilst a gas-filled diode 245 is provided to by-pass any voltage surge due to flash-over in the main oscillator unit.

To apply a frequency wobble to the rate at which control pulses are fed to the oscillator unit, the grid and screen of a valve 246 are back-coupled to generate high-frequency oscillations, which are first automatically converted into relaxation oscillations having a frequency determined by the values of the grid condenser 247 and leak resistance 248. In practice the second or relaxation frequency is arranged to be of the order of four cycles a second. Meanwhile a condenser 249 shunted across the anode and cathode of the valve 246 is charged through a resistance 250, and is discharged at the relaxation frequency. The saw-toothed voltage so produced is applied through a condenser 251 to the grid of a low-impedance cathode-follower valve 252, the resulting changes of cathode voltage being fed through a potentiometer 253, to vary the grid-bias and hence the repetition frequency of the valve 230. The frequency wobble can, in turn, be adjusted by varying the setting of the potentiometer 253. A filter circuit formed by condensers 254, 255 and resistance 256, serves to bypass high-frequency oscillation in the output of the valve 246. The time base circuit of the monitor tube is synchronized with the outgoing pulses, by negative impulses from the anode circuit of the amplifier 236, which are taken off at the terminal 247. The forward stroke of the spot is made visible by means of positive impulses from the resistance 248 which overcome a negative bias on the monitor tube grid. The back-stroke is thus automatically eliminated.

The pulsed exploring signal is radiated from one or the other of two alternative aerial systems, of which one is a single horizontal dipole 249 (Fig. 12) with a broadside figure-of-eight response curve, and is used for searching operations. The other aerial comprises an array of four horizontal dipoles, 250 which is backed by a screen of wire-netting and radiates a unilateral beam of high concentration in the direction of the target. For this purpose the aerial array is rotated, to face the right direction, in accordance with information automatically transmitted by Selsyn or similar gearing from the bearing indicator in the receiver. The dipoles are provided with impedance-matching stubs to which the feed-lines are adjustably coupled in accordance with particular signal frequency that is being transmitted. Telescopic end-pieces are also fitted, both to the dipoles proper and to the matching stubs, to enable them to be adjusted for working over a frequency range of say 55 to 85 megacycles.

The principal circuits of the receiver are shown schematically in Fig. 14. Before describing the circuits in detail, an outline will be given of the more important features.

The slant-range of the target is found by measuring the time-interval between an outgoing pulse and its reflected echo, as indicated by the displacement of the echo trace on the fluorescent screen of a cathode ray tube 251. This displacement is measured by means of a calibrated potentiometer 252 which is used to bring the echo-trace to the centre of the screen, thereby allowing the nominal displacement of the trace to be measured in terms of the control voltage required to centre it. By means of the ganged potentiometer 253 this control is applied simultaneously to the cathode ray tubes 254, 255 which indicate the angles of bearing and elevation respectively, so that when any selected echo-trace is centered, say on the range tube, the counterpart echo-traces are simultaneously brought to the centres of both the other tubes. This method of co-ordinated potentiometer control is the same as that previously described with reference to Figs. 3–5.

The cathode ray tube 254 is used to indicate the bearing in azimuth of the distant body, by swinging an aerial system 256 comprising two horizontally separated dipoles until the setting is reached at which the output has a minimum value. For this purpose the signals received on the bearing aerial are combined first in phase and then in phase-opposition with those received on the range aerial 257 through a continuously driven switch 258 so as to produce the so-called cardioid response. The required bearing is shown when the trace on the screen remains at constant amplitude, because no output is then being received from the bearing aerial. Meanwhile any deviation to port is clearly differentiated from a deviation to starboard so that once a bearing has been obtained, subsequent changes in bearing of the body under observation can be followed without ambiguity.

A third cathode ray tube 255 is used to indicate the elevation of the distant body. Here the reflected signal is received simultaneously on two aerials 260, 261, which are displaced in the vertical plane, and are coupled to a goniometer 262, the angle of elevation being shown by the setting of the goniometer which gives zero or minimum output. Here also the signals received by the elevation dipoles are combined first in phase and then in phase opposition with those received on the range dipole by means of a continuously-rotated switch 259, whereby a similar cardioid effect is produced to allow increases in the angle of elevation of the body to be clearly distinguished from decreases in this angle.

Special provision is made to facilitate the necessary comparison of signal strengths on the bearing and elevation tubes. In the first place a signal selecting device 262 which is under the control of an auxiliary potentiometer 263 ganged to the main potentiometer unit, is used to prevent any signal-trace, other than the one already centered, from appearing on the screens of the bearing and elevation tubes, automatic volume control being applied to the traces shown. In the next place the sum and difference signals produced by the action of the reversing switch 258, 259 are separated from each other along the time-base and are presented in different colours on the screens of both tubes.

A single horizontal dipole 257 serves as the range aerial and is mounted half a wavelength above ground in the same vertical plane as a pair of similar dipoles 256 which are spaced apart horizontally to give a directional response in azimuth. The maximum forward lobe of the figure-of-eight response of the range dipole 257 is arranged to coincide with the forward minimum or crevasse in the butterfly-wing response of the bearing dipoles 256. The latter are connected, in opposition, to the aerial reversing switch 258 through a phasing-box 264 which permits the bearing signal to be brought into phase with the signal from the range aerial, should the bearing dipoles not be broadside-on to the target.

The elevation-finding aerial consists of two horizontal dipoles 260, 261 which are spaced apart vertically and are connected to the two fixed coils of a goniometer, the search-coil of which is coupled to the aerial reversing switch 259. The signals received by the two dipoles are in the same phase (or in phase opposition) but differ in amplitude to an extent which depends upon the elevation of the reflecting body. Moreover, if the upper and lower dipoles are kept at the same relative heights, in terms of the working wavelength, the amplitude ratio of the received signals remains constant for different wavelengths. The variation of signal ratio does not, however, follow a straight-line law with variation in elevation of the body under observation so that it is necessary to introduce a correcting factor in order to simplify calibration. For this purpose, the relative spacing and height of the dipoles are first chosen to give a signal-ratio curve which not only lends itself to uniform calibration but also shows high sensitivity over a range of angles extending say from 10° to 80° from the horizontal. These conditions are found to exist when one dipole is set approximately one wavelength above ground and the other approximately half a wavelength above it. A correcting cam having the same contour as the optimum signal-ratio curve is therefore interposed between the shaft of the search-coil of the goniometer and a control dial so as to allow the latter to be uniformly calibrated in degrees of elevation.

In order to prevent interaction between the bearing and elevation dipoles, they are fed by transmission lines which are an integral number of half waves long, so that both aerials work into a high impedance. Owing to imperfect reflection from the ground some difference in phase may arise between the two elevation dipoles, so that they do not completely balance out across the goniometer. In this case equality on both sides of the aerial reversing switch can be obtained by turning the search coil until the residual signal is in phase-quadrature with the signal from the range dipole. When searching for a distant body, the top elevation dipole is preferably used in place of the range dipole and is provided with a reflector to determine "sense." In these circumstances the stand-by switch is opened, and the goniometer control is adjusted so that the search-coil is coupled only to the fixed coil of the upper dipole.

All the dipoles are fitted with adjustable stubs for matching the impedance of the feed-lines to that of the aerial, and with telescopic end-pieces to tune the aerial to different frequencies, within say a working range of 55 to 85 megacycles.

A switch 265, driven by the aerial reversing switches 258, 259 applies a momentary voltage to the sweep deflecting plates of the bearing and elevation tubes 254, 255 in order to separate the trace produced by the addition of the range and bearing aerial voltages from the trace due to their difference on the tube 254, and to separate the corresponding traces on the tube 255. This separation facilitates the necessary comparison of signal strengths. The aerial reversing switch also drives a stroboscopic disc 266 fitted with differently-coloured windows, which rotates in front of both tubes and is so synchronized that the screen of the bearing tube is only visible when the bearing aerial is coupled to it, the elevation screen then being obturated and vice versa. As a further aid to the observer the coloured windows are arranged so that the summation signals on both tubes are shown through the red whilst difference signals appear only through the green windows of the stroboscopic disc.

The three aerial systems are connected to a common signal receiver comprising a radio frequency amplifier 267, mixer 268, local oscillator 269, intermediate frequency amplifier 270, second detector 271 and video output stages 272, 273, connected to the signal plates of the range indicating tube 251 and the bearing and elevation indicating tubes 254, 255. The amplitude of the output will very cyclically, representing in turn the output of the range aerial plus the differential output of the bearing aerial, the range aerial output plus the differential output of the elevation aerials, the range aerial output minus the differential output of the bearing aerials, and the range aerial output minus the differential output of the elevation aerials. This cyclical fluctuation of the amplitude of the echo trace on the range tube screen is of little importance since it is the position of this trace which has to be measured and, in any event, the fluctuation tends to disappear when the bearing and elevation of the selected target have been properly obtained, since the differential output of the range and bearing aerials is then substantially zero. Owing to the action of the stroboscopic disc 266 and the separating switch 265 already explained, the variations in output are visible as four separate and distinct traces on the screen of the bearing and elevation tubes.

A time base generator 274 for the range tube and a common time base generator 275 for the bearing and elevation tubes provide the necessary sweep voltages and are synchronized with the transmitter by means of a locking amplifier 276 and a multivibrator 277. A third time base generator 278, also synchronized by the multivibrator is provided for the signal selecting circuit 262. This comprises a valve which is normally cut-off and has the initial potential between its grid and its earthed cathode variable over a wide range by means of a potentiometer 263 ganged to the potentiometers 252, 253. The sweep voltage from the generator 278 is applied to the grid, so that each time the rising voltage on the grid passes through earth potential and equals the cathode voltage the valve suddenly conducts. The time at which this occurs depends upon the setting of the potentiometer 263 and matters are so arranged that the timing of the impulses thus produced is such as to make them in step with the echo signal pulses producing the echo trace which is centred on the range tube screen by the action of the potentiometer 252. These signal selecting impulses are utilized to release or intensify the electron beams of the tubes 254, 255 so that only the counterparts of the echo trace centred on the range tube screen can appear at full brightness on the screens of the bearing and elevation tubes. The signal selecting impulses are also utilized to condition an automatic gain control circuit 279 for operation, whereby automatic gain control of the selected signal and no other is applied to certain stages of radio frequency amplifier 267. Manual gain control is applied to this amplifier by means of the resistance 280. Reference 281 indicates a valve which is arranged to release the electron beam of the range tube during the forward sweep of the spot whilst 282 is a calibrator circuit which is utilized in a similar manner to that previously described.

Details of the signal receiver are shown in Fig. 15 and 16. The radio frequency amplifier 267 has five stages of which the first two 283, 284 and the last 285 are shown in Fig. 15. The stages are resistance capacity coupled and have tuned grid circuits connected by ganged controls. Automatic volume control is applied to the grids of the third, fourth, and fifth stages. A diode 268 serves as the mixer, the anode being coupled to the last stage 285 and the cathode to the local oscillator 269, the grid of the latter being separately tuned by a condenser 286. The resulting beat frequency is fed to the input of the intermediate-frequency amplifier through a choke 287 and a band-pass circuit formed by two tuned circuits 288, 289 and 290, 291 (Fig. 16) which are coupled together by the screened connecting lead 292.

To eliminate heterodyne interference a filter circuit is switched across the input to the intermediate-frequency amplifier (Fig. 16). It includes a resistance 293 in series with a condenser 294, both shunted by a pair of variable condensers 295 which are, in turn, earthed through an inductance 296. The resistance 293 is separately earthed by a pair of condensers of which 297 is variable. The filter is tuned to the frequency to be cut out by varying the condensers 295, and complete elimination is then secured by adjusting the condenser 297.

The common intermediate-frequency amplifier comprises five stages of which the first two 298, 299 and the last 300 are shown in Fig. 16. All are resistance-capacity coupled and have tuned grid circuits, which are preset and alternately staggered slightly above and slightly below a nominal "fixed" frequency of say 9 megacycles, in order to give a more uniform frequency-response. A resistance 301 in the common cathode circuit of the first two stages is provided to reduce valve-noise. The last stage 300 is coupled to a diode rectifier 271, the cathode of which is coupled to two output stages 272, 273 arranged in parallel. The stage 273 feeds the bearing and elevation cathode ray tubes, whilst the stage 272 feeds the range tube. A connection from 273 is also taken through a resistance 302 to the AVC resistances for the radio-frequency amplifier.

The time base generators are shown schematically in Figs. 17 (a, b, c). As shown in Fig. 17 (a), the usual discharger valve 302, time base condenser 303 and charging resistance 304 serve both the bearing and elevation tubes 254, 255 and as shown in Fig. 17 (b) a separate discharger valve 305, condenser 306 and resistance 307 are used for the range tube 251. An auxiliary time-base, shown in Fig. 17 (c) and comprising the discharger valve 308, condenser 309 and resistance 310, is also provided for the signal-selecting device.

The potentiometer control unit already described comprises electrically-symmetrical limbs, such as 253, 252 (Figs. 17 a, b) which are branched across the supply voltages 311, 312 of the time-base circuits and are provided with ganged sliders 313, 314. A selected echo-trace is brought to the centre of the range tube 251 by setting the slider 314 so that a suitable biasing voltage is applied to one of the deflecting plates of the tube. The slant-range of the distant body producing the selected signal-trace can then be read off directly in terms of the applied biasing voltage on the calibrated scale of the potentiometer. The electrical symmetry of the potentiometer, and the common movement of the ganged sliders 313, 314 automatically brings the same selected signal trace simultaneously to the centre of all three tubes. The use of leakage-guards has been described with reference to Fig. 5, but in the present example they are of rather different construction. Referring to Fig. 17 (a) the guard resistance described in Fig. 5 is replaced by two valves 315, 316 connected in series across the power supply 311. The valve 316 is a pentode or other valve having a constant current characteristic and serves in effect as a sensitive high resistance in the cathode circuit of the valve 315. The latter accordingly acts as a cathode-follower and the voltage on its grid follows that on its cathode under all working conditions. As before the power supply "floats," the grid of 315 being connected to the slider 313, whilst its cathode is the only earthed point in the system. Any leakage current from the high potential parts of the system to earth will flow through 315, but the grid connection automatically keeps 313 approximately at earth potential for all settings. The microammeter 317 in the earthed lead serves to indicate the presence of any excessive leakage. Similar components 318, 319, 320 are provided for the potentiometer 252 in Fig. 17 (b).

An auxiliary branch 263 (Fig. 17c) of the potentiometer unit is provided in combination with the auxiliary time-base circuit 308, 309, 310 for the purpose of actuating the signal-selecting device whereby all signal traces are excluded from the screens of the bearing and elevation tubes other than the particular trace which has already been centered by the potentiometer control. The manner in which this is done will be described in detail in Fig. 19. For the moment it is important to note that the cathode of the cathode-follower valve 321 of the leakage guard is earthed, that its grid is therefore approximately at earth potential, and that the slider 322 is ganged to the other sliders 313, 314 of the potentiometer. It should also be stated that the resistance 323 is for all relevant purposes the equivalent of the constant-current valves 316, 319 in the other guard circuits.

The time-base circuit for the range tube is shown in detail in Fig. 18. Synchronizing impulses are fed from the transmitter through a concentric cable, and are applied to the cathode of a locking amplifier 324. The anode of this valve is connected to the grid of the discharge valve 305, Fig. 17 (b), and to the anode of one of two valves 325, 326 which form a cross-coupled relay or multivibrator. Initially the valve 326 is conducting and keeps the valve 325 non-conducting by the bias developed across the common cathode resistance 327. The negative impulse from the locking amplifier 324 trips the relay so that the valve 326 is paralyzed and the valve 325 starts to conduct. This persists until the charge built upon the condenser 328 leaks away, whereupon the relay reverts to its initial condition. The result is that the original voltage impulse from the locking amplifier is prolonged for a period of approximately 300 microseconds. This prolonged pulse is also applied to the grid of the time-base discharge valve 305, and also to a valve 281 which passes a positive pulse to the negatively-biased control grid of the range tube 251 and releases the electron stream during the forward sweep of the spot.

The time-base circuit for the bearing and elevation tubes is similar to the one used for the range tube. It is synchronized by the multivibrator 325, 326. The sweeping voltages are however applied to traverse the spot vertically instead of horizontally across the screen.

To ensure clear focussing it is desirable that the voltage on both sweep deflecting plates should be approximately the same as the voltage on the earthed anode of each cathode ray tube. For this reason, the potentiometer unit, and each time-base circuit and power supply pack, are all carefully insulated, the control slider of the potentiometer being the ony earthed point in each system. Actually, as already described, the cathode of the valves 315, 318, 321 (Figs. 17 a, b, c) in the guard circuits are earthed, and the sliders are taken to the grids of these valves, but since these valves function as cathode-followers their grids and cathodes keep in step, and the voltage on the sliders and on the sweep deflecting plates of the tubes is therefore always substantially at earth potential.

Figure 17C:
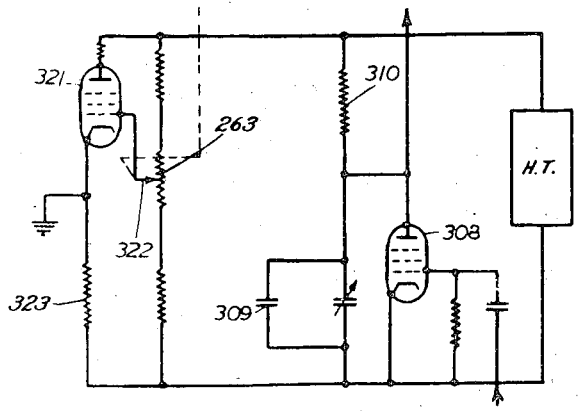

Fig. 19 shows the signal-selecting and automatic gain control circuits, and also the cathode-follower 321 forming part of the potentiometer guard circuit of Fig. 17 (c). The signal-selector time-base condenser 309 (Fig. 17c) is charged from the 800-volt supply through a resistance 310 and is discharged by the valve 308 which is synchronized by impulses from the multivibrator 325, 326 (Fig. 18). Signal selection begins when voltage from the charging condenser 309 sweeps the grid of a valve 330, Fig. 19, past earth potential. The time at which this occurs during each cycle of the sweep voltage can be varied by means of the potentiometer 263 (Fig. 17 (c)) since the setting of this potentiometer fixes the starting value of the voltage sweep in relation to earth potential, i. e. the voltage time curve of the condenser 309 will be shifted bodily up and down with respect to earth potential by varying the setting of the potentiometer 263. Since the latter is ganged to the potentiometer 252 for the range tube the act of operating 252 to centre a trace on the range tube automatically ensures that the time at which the sweep voltage passes earth potential coincides with the arrival of the selected echo. Consequently the valve 330 conducts, each time the spot passes the centre of the screen of the range tube. The resulting variations in voltage are applied from the anode of the valve 330 through a condenser 331 to the grid of the valve 332, which, in turn, feeds positive pulses to counteract the prohibitive bias normally applied to the control grids of the bearing and elevation tubes 254, 255. The positive pulses last for a period of the order of four microseconds and release each stream only whilst the spot is passing across the centre of the screen. No echo-trace other than that centered by the potentiometer control can therefore appear on the screen of either the bearing or elevation tube. This helps to simplify the necessary comparison of signal amplitudes.

As already mentioned, automatic volume control is applied to the signals that are actually under observation. For this purpose signals from the output of the signal receiver (273 in Fig. 16) are applied through a valve 333, Fig. 19, to the control grid of a valve 334, the suppressor grid of which is coupled to the anode of the valve 332 forming part of the signal-selector circuit. The valve 334 feeds a pair of diodes 335, 336 which are arranged to develop a delayed automatic volume control voltage for the radio-frequency amplifier. Since the valve 334 can only pass current when both its control and suppressor grids are suitably biased, and as this only happens when the spot is passing across the centre of the tube, the automatic volume control is effectively limited to signals then centred on the screens. Should such a signal develop a peak voltage in excess of the delay bias provided by a resistance 337, the diode 336 starts to conduct, and a gain-control voltage from a resistance 338 is applied to the third, fourth and fifth stages of the radio-frequency amplifier.

The calibrator 282 (Fig. 14) is substantially the same as that illustrated in Fig. 10 and need not be described in detail. It is designed to produce a signal consisting of a train of waves having a frequency of 164 k. c. per second and lasting for a period of 300 microseconds. Each train is followed by a quiescent period of 1300 microseconds. The output is applied to the signal plates of the range tube as described in connection with Fig. 10, and the calibrating procedure is substantially the same.

I claim as my invention:

1. A radio installation for locating the position of a distant body comprising means for generating and radiating a pulse modulated exploring beam of radio frequency energy, means for picking up the echo signal produced by reflection of the exploring beam at the body including an aerial directionally responsive in azimuth, a first cathode ray oscillograph for measuring the time interval between an outgoing pulse and its incoming echo, a second cathode ray oscillograph for indicating the signal amplitude received on said directional aerial, sweep plates for each oscillograph, a time base voltage generator connected to said sweep plates, means for presenting the echo signals against a time base on the screen of each oscillograph, a first potentiometer for applying an adjustable steady voltage to the sweep plates of said first oscillograph, a second potentiometer for applying a steady voltage to the sweep plates of said second oscillograph, means including a third potentiometer for generating signal-selecting impulses, said third potentiometer serving to control the timing of said impulses, means for applying said impulses to control the intensity of the electron beam of said second oscillograph, ganged sliders for said three potentiometers and a common control handle calibrated in terms of range for said sliders.

2. An installation according to claim 1 wherein said impulse generating means includes a thermionic valve and means for applying to the grid of said valve a saw-toothed sweep voltage, synchronous with the time base voltages of said oscillographs, the grid-cathode potential of said valve being variable by means of said third potentiometer.

3. A radio installation for locating the position of a distant body comprising means for generating and radiating a pulse modulated exploring beam of radio frequency energy, means for picking up the echo signal produced by reflection of the exploring beam at the body including an aerial directionally responsive in azimuth, a first cathode ray oscillograph for measuring the time interval between an outgoing pulse and its incoming echo, a second cathode ray oscillograph for indicating the signal amplitude received on said directional aerial, means for presenting the echo signals against a time base on the screen of each oscillograph, a potentiometer control for simultaneously shifting a chosen signal trace on the screen of said first oscillograph and its counterpart on the screen of said second oscillograph to the centers of said screens, a circuit including a crystal-controlled oscillator for producing discrete trains of oscillations of a predetermined frequency, and switching means for applying said oscillations to said oscillographs in place of said echo signal to produce a calibrating pattern on the screens of said oscillographs.

4. A radio installation for locating the position of a distant body comprising means for generating and radiating a pulse modulated exploring beam of radio frequency energy, means for picking up the echo signal produced by reflection of the exploring beam at the body including a first aerial and a second aerial directionally responsive in azimuth, switching means for alternately combining the outputs of said aerials in phase and in phase opposition, a first cathode ray oscillograph for measuring the time displacement between an outgoing pulse and its incoming echo, means for presenting the output of said switching means against a time base on the screen of said oscillograph, a second cathode ray oscillograph for comparing the amplitude of the sum of said aerial outputs with the amplitude of their difference, sweep plates for each oscillograph, a time base voltage generator connected to said sweep plates, means for presenting the output of said switching means against a time base on the screen of said second oscillograph, means for applying a periodic shift voltage to the sweep plates of said second oscillograph to separate the trace due to the sum of the aerial outputs from the trace due to their difference, and a potentiometer control for correlating a chosen signal trace on the screen of said first oscillograph with its counterpart on the screen of said second oscillograph.

5. A radio installation for locating the position of a distant body comprising means for generating and radiating a pulse modulated exploring beam of radio frequency energy, means for picking up the echo signal produced by reflection of the exploring beam at the body including a first aerial directionally responsive in and rotatable in azimuth, a second aerial directionally responsive in elevation, a goniometer and a search coil for said goniometer electromagnetically coupled to the elements of said second aerial, a first cathode ray oscillograph for measuring the time interval between an outgoing pulse and its incoming echo, a second cathode ray oscillograph for indicating the position of minimum signal reception of said first aerial, a third cathode ray oscillograph for indicating the position of minimum signal reception of said search coil, means for presenting the echo signals against a time base on the screen of each oscillograph, and a potentiometer control for correlating a chosen signal trace on the screen of said first oscillograph with its counterpart on the screen of said second and third oscillographs.

6. A radio installation for locating the position of a distant body comprising means for generating and radiating a pulse modulated exploring beam of radio frequency energy, means for picking up the echo signal produced by reflection of the exploring beam at the body including a first aerial, a second aerial directionally responsive in azimuth and a third aerial directionally responsive in elevation, a common signal channel for said aerials, switching means for feeding said channel in a given sequence with the sum of the outputs of the first and second aerials, their difference, the sum of the outputs of the first and third aerials, and their difference, a first cathode ray oscillograph for measuring the time interval between an outgoing pulse and its incoming echo, a second cathode ray oscillograph for comparing the amplitudes of the sum and difference of the outputs of the first and second aerials, a third cathode ray oscillograph for comparing the amplitudes of the sum and difference of the outputs of the first and third aerials, sweep plates for each oscillograph, a time base voltage generator connected to said sweep plates, means for presenting the output of said channel against a time base on the screens of said oscillographs, means for applying periodic shift voltages to the sweep plates of said second and third oscillographs to separate the trace due to the sum from the trace due to the difference of the aerial outputs, stroboscopic means for rendering visible on the screen of said second oscillograph the traces due to the combined outputs of said first and second aerials only and on the screen of said third oscillograph the traces due to the combined outputs of said first and third aerials only, and a potentiometer control for correlating a chosen signal trace on the screen of said first oscillograph with its counterpart on the screen of said second and third oscillographs.

7. In radio locating apparatus of the type wherein the position of a distant body is located by means of radio frequency energy radiated in the form of an exploring beam by a transmitter and reflected by the target in the form of echo pulses back to a receiver, a plurality of cathode ray oscillographs each indicating a co-ordinate magnitude of the position of an object, one of said oscillographs being adapted to indicate the range of said object, means for presenting echo pulses reflected from said object against a time base on the screen of each oscillograph, adjusting means for shifting simultaneously the positions of the traces produced by said echo pulses along said time bases, means for generating signal selecting impulses, means for controlling the timing of said impulses with respect to the timing of said echo pulses, a common control member for simultaneously actuating said adjusting means and said timing control means, and means for utilizing said impulses to control the intensity of the electron beam of at least one other oscillograph in order to emphasize only the trace produced by said echo pulses on the screen thereof.

PHILIP EDWARD POLLARD.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,189,549 | Hershberger | Feb. 6, 1940 |
| 2,239,678 | Jobst | Apr. 29, 1941 |
| 2,340,539 | Koschmieder | Feb. 1, 1944 |
| 2,416,088 | Deerhake | Feb. 18, 1947 |

FOREIGN PATENTS

| Number | Country | Date |
| --- | --- | --- |
| 552,072 | Great Britain | Mar. 22, 1943 |

OTHER REFERENCES

"Engineering Test Manual for May, 1937, Experimental Types of Detectors for Use Against Aircraft," prepared at Signal Corps Laboratories, Fort Monmouth, N. J., May 17, 1937. (Copy in Div. 51.)

Affidavit of Clarence A. Boddie, dated December 20, 1947. (Orig. in Div. 51.)